United States Patent Office 3,284,171
Patented Nov. 8, 1966

3,284,171
PROCESS FOR CONCENTRATING ORTHOPHOSPHORIC ACID WITH A MISCIBLE WATER ENTRAINER AND CRYSTALLIZING
Douglas Charles Harper, 135 Rushmere Road, Ipswich, England
No Drawing. Filed Mar. 27, 1964, Ser. No. 355,449
Claims priority, application Great Britain, Apr. 6, 1963, 13,776/63
14 Claims. (Cl. 23—301)

The present invention relates to the preparation of concentrated orthophosphoric acid from aqueous phosphoric acid.

Phosphoric acid is produced commercially mainly by two methods, the wet process and the electrothermal process.

The so called wet process for the manufacture of phosphoric acid involves the reaction of phosphate rock with sulphuric acid followed by the removal of calcium sulphate to leave a dilute solution of phosphoric acid containing for example 20–45% by weight of $P_2O_5$. These values correspond to 28–60% by weight of orthophosphoric acid ($H_3PO_4$). More concentrated solutions of orthophosphoric acid can be obtained from these dilute solutions by evaporation to give solutions containing 55–76% by weight of orthophosphoric acid. However, in order to avoid the formation of pyrophosphoric acid the temperature of the orthophosphoric acid during evaporation must be maintained below about 150° C. and at these relatively low temperatures long periods of time are required to effect the dehydration, particularly if anhydrous or substantially anhydrous orthophosphoric acid is being prepared.

Attempts have been made to use immiscible entrainers, such as benzene or methylene chloride, for such dehydration, but these have been unsuccessful.

It has now been found that aqueous solutions of orthophosphoric acid can be concentrated quickly and effectively by distillation of the solution of orthophosphoric acid in the presence of a miscible entrainer, and that the formation of pyrophosphoric acid can be avoided.

Accordingly the present invention is for a process for concentrating aqueous solutions of orthophosphoric acid which comprises forming a mixture comprising the aqueous solution of orthophosphoric acid and a miscible water entrainer, subjecting the mixture to a distillation step at a temperature below 150° C. preferably below 110° C. and obtaining concentrated orthophosphoric acid as the residue.

The miscible water entrainer which may be used in the process of the present invention should have a boiling point below 170° C. and may comprise carboxylic acids containing up to five carbon atoms such as formic acid, acetic acid, propionic acid and butyric acid; alcohols such as ethanol, propanol, butanol and 2-chloroethanol; ketones such as acetone, methyl ethyl ketone and cyclohexanone; esters such as isopropyl acetate, isobutyl acetate, ethyl n-butyrate, n-butyl acetate, n-amyl acetate, isoamyl acetate, ethyl chloracetate and n-butyl-n-butyrate; ethers such as diethyl ether and di-isopropyl ether; and mixtures of any of these together.

It has been found that particularly good results are obtained where acetic acid is used as the entrainer. Accordingly, a preferred embodiment of the invention comprises forming a mixture comprising an aqueous solution of orthophosphoric acid and acetic acid subjecting the mixture to a distillation step and obtaining concentrated orthophosphoric acid as the residue.

The proportion of the miscible water entrainer used in the process of the present invention is related to the amount of water to be removed from the aqueous acid. The present invention provides a process for preparing phosphoric acid of a concentration in excess of 98%, and the acid being concentrated may be of any concentration below this. The distillation of relatively dilute aqueous solutions of phosphoric acid can be readily accomplished; the difficulties arise in the concentration of phosphoric acid above about 75% and particularly above 90%. Consequently in the concentration of dilute solutions of phosphoric it is convenient, and economical in the use of the entrainer, to carry out the distillation in two stages, the first stage involving a simple distillation or evaporation of the orthophosphoric acid and the second stage involving the formation of a mixture comprising the product from the first stage and the miscible entrainer and the distillation of this mixture to obtain concentrated orthophosphoric acid as the residue.

It will be clear from the above that the proportion of entrainer used will depend on the actual conditions used. As a generality the amount of entrainer will be in the range 30–300%, suitably 70–200%, by weight of the aqueous phosphoric acid.

Where the entrainer is an alcohol, there is some risk of esterification, and the amount of alcohol used should be the minimum required, and the distillation carried out as quickly as possible.

The distillation of the mixture comprising the aqueous orthophosphoric acid and entraining agent may be carried out at temperatures up to 150° C. but is preferably carried out at temperatures below 110° C. In order to perform the distillation at these low temperatures it may be necessary to carry out the distillation under reduced pressure. Preferably the process of the present invention is carried out under a pressure of less than 110 millimetres of mercury.

The orthophosphoric acid obtained by the process of the present invention may contain as little as 1% by weight of water. The residual quantities of water and other impurities may be removed by crystallisation of the orthophosphoric acid and removal of the mother liquors, from the crystals of orthophosphoric acid. The crystallisation of the orthophosphoric acid may be encouraged by seeding. The preparation of crystalline orthophosphoric acid is a special feature of the present invention.

Accordingly a preferred embodiment of the invention is for the preparation of crystalline orthophosphoric acid by the steps of distilling a mixture of aqueous orthophosphoric acid and a miscible water entrainer at a temperature below 150° C. to obtain orthophosphoric acid of a concentration of at least 95% by weight and preferably at least 98% by weight, and crystallising the orthophosphoric acid therefrom. The crystallisation is carried out by cooling the orthophosphoric acid, generally with seeding. Recrystallisation can be carried out by warming with a minute amount of added water to melt, cooling and seeding.

The present invention may be applied to phosphoric acid from any source, for example, electrothermal or wet process acid. The invention is of particular application to wet process acid, and in this case the contaminants present in the wet process acid are largely removed, the volatile contaminants being removed during the distillation, and the non-volatile contaminants during the final crystallisation.

The following examples are given to illustrate the process of the present invention, parts and percentages are by weight unless otherwise indicated.

*Example 1*

500 parts of electrothermal phosphoric acid (90% $H_3PO_4$) was mixed with 600 parts of glacial acetic acid and the mixture distilled at a pressure of 2 millimetres of mercury. The distillate had a boiling point of about 25° C. at this pressure and was collected in a cooled receiver. The distillation vessel was heated progressively to 80° C. to maintain a convenient rate of distillation. The residue (440 parts) was solid orthophosphoric acid (98% $H_3PO_4$) and had a melting point of 41° C.

*Example 2*

500 parts of clarified wet process phosphoric acid (69% $H_3PO_4$) were mixed with 500 parts of glacial acetic acid and the mixture distilled as described in Example 1. On crystallisation 279 parts of orthophosphoric acid were obtained having a melting point of 40° C. which on recrystallisation gave 250 parts of crystalline orthophosphoric acid having a melting point of 41° C. The concentration of fluoride in the phosphoric acid was reduced from an initial 20,000 parts per million to less than 20 parts per million.

*Example 3*

200 parts of dilute phosphoric acid (25% $H_3PO_4$) were mixed with 400 parts of glacial acetic acid and the mixture distilled as described in Example 1. The product was crystallised and 48 parts of crystalline orthophosphoric acid were obtained having a melting point of 41° C.

*Example 4*

A mixture of 100 parts of clarified wet process phosphoric acid (69% $H_3PO_4$) and 100 parts of glacial acetic acid was distilled under a pressure of 10 centimetres of mercury. The distillation residue was cooled and crystallised with seeding giving 51 parts of crystalline orthophosphoric acid having a melting point of 39–41° C.

*Example 5*

A mixture of 383 parts of 52% phosphoric acid and 495 parts of n-butanol was distilled at increasing temperature up to 100° C. under a pressure of 0.3 millimetres of mercury. The cooled residue on seeding gave 111 parts of crystalline phosphoric acid.

*Example 6*

A mixture of 200 parts of filtered commercial phosphoric acid (69% $H_3PO_4$) and 250 parts of N-propionic acid was distilled under a pressure of 2 millimetres of mercury. The distillate was collected in a cooled receiver. The distillation vessel was heated progressively to 110° C. and left a residue which on cooling and seeding crystallised to give 122 parts of crystalline phosphoric acid.

*Example 7*

A mixture of 100 parts of 52% phosphoric acid and 130 parts of n-amyl acetate was distilled at increasing temperature up to 95° C. under a pressure of 0.5 millimetres of mercury. Upon cooling and seeding the residue from the distillation gave 29 parts of crystalline phosphoric acid.

I claim:

1. A process for concentrating aqueous solutions of orthophosphoric acid which comprises forming a mixture comprising an aqueous solution of orthophosphoric acid and 30–300% by weight, based on the aqueous orthophosphoric acid, of a miscible water entrainer, subjecting the mixture to a distillation step at a temperature below 150° C. to obtain a residue comprising 95% by weight of orthopsphoric acid.

2. A process as claimed in claim 1 wherein the entrainer has a boiling point below 170° C. and is selected from the group consisting of carboxylic acids, alcohols, esters, ketones and ethers.

3. A process as claimed in claim 1 wherein the amount of entrainer is in the range 70–200% by weight of the aqueous orthophosphoric acid.

4. A process as claimed in claim 1 wherein the distillation step is carried out at a temperature of less than 110° C.

5. A process as claimed in claim 1 wherein the distillation is carried out under reduced pressure.

6. A process as claimed in claim 1 wherein the distillation is carried out at a pressure of less than 110 millimetres of mercury.

7. A process for concentrating aqueous solutions of orthophosphoric acid which comprises distilling the aqueous orthophosphoric acid in the presence of acetic acid at a temperautre below 150° C. and recovering the concentrated orthophosphoric acid as the distillation residue.

8. A process as claimed in claim 7 wherein the amount of acetic acid is in the range 30–300% by weight of the aqueous orthophosphoric acid.

9. A process as claimed in claim 7 wherein the orthophosphoric acid is concentrated to at least 95% by weight.

10. A process for the preparation of crystalline orthophosphoric acid which comprises distilling aqueous orthophosphoric acid in the presence of a miscible water entrainer at a temperature below 150° C. to obtain a residue comprising orthophosphoric acid of a concentration of at least 95% by weight, and cooling the residue to yield crystalline orthophosphoric acid.

11. A process as claimed in claim 10 wherein the orthophosphoric acid is concentrated to at least 98% by weight.

12. A process as claimed in claim 10 wherein the orthophosphoric acid is crystallised with seeding.

13. A process as claimed in claim 10 wherein the crystalline orthophosphoric acid is recrystallised.

14. A process for the preparation of crystalline orthophosphoric acid which comprises distilling aqueous orthophosphoric acid in the presence of acetic acid at a temperautre below 150° C. to obtain a residue comprising orthophosphoric acid of a concentration of at least 98% by weight, and cooling the residue to yield crystalline orthophosphoric acid.

References Cited by the Examiner

UNITED STATES PATENTS

| | | | |
|---|---|---|---|
| 1,008,690 | 11/1911 | Brauer | 202—57 X |
| 1,283,398 | 10/1918 | Carothers et al. | 23—165 X |
| 2,049,441 | 8/1936 | Gordon | 202—42 X |
| 2,091,898 | 8/1937 | Weber | 23—165 X |
| 2,684,286 | 7/1954 | Kreiger | 203—12 |
| 2,703,309 | 3/1955 | Painter | 202—57 |
| 2,847,285 | 8/1958 | Pahud | 23—300 |

NORMAN YUDKOFF, *Primary Examiner.*

G. P. HINES, *Assistant Examiner.*